Oct. 27, 1931.  A. F. SHAFTER  1,829,192
FOLDING IMPLEMENT
Filed Jan. 4, 1930
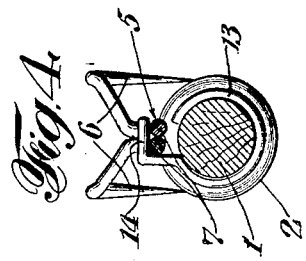
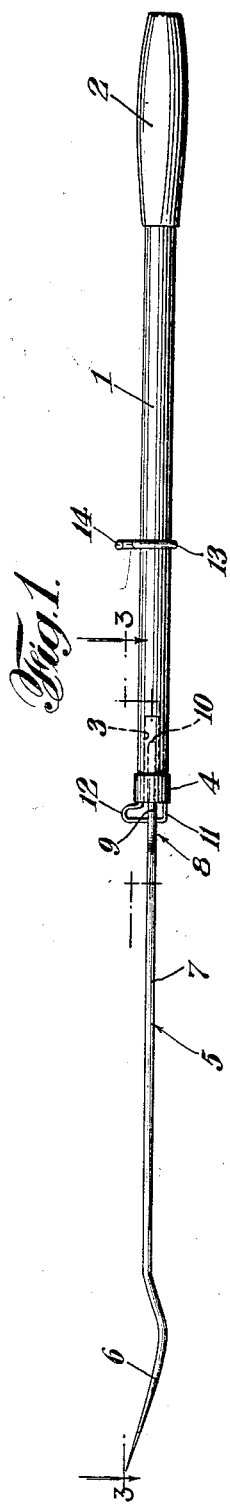
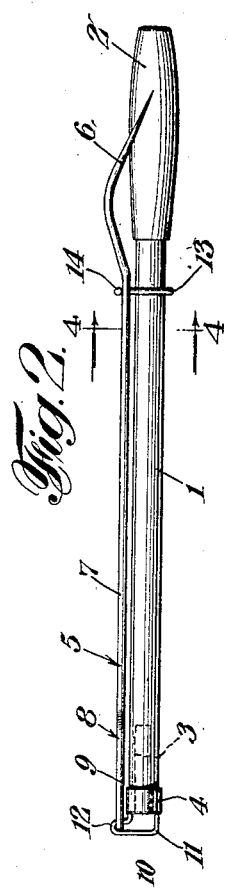
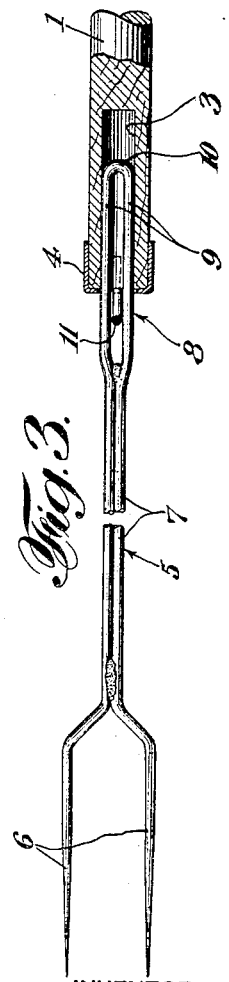
INVENTOR
Adolph F. Shafter
BY
Prindle, Bean & Mann
ATTORNEY Patented Oct. 27, 1931

1,829,192

UNITED STATES PATENT OFFICE

ADOLPH F. SHAFTER, OF DECATUR, ILLINOIS, ASSIGNOR TO U. S. MANUFACTURING CORPORATION, OF DECATUR, ILLINOIS, A CORPORATION OF ILLINOIS

FOLDING IMPLEMENT

Application filed January 4, 1930. Serial No. 418,484.

This invention relates to improvements in folding or knockdown implements or utensils and relates primarily to devices of that kind which are of considerable length and which present difficulties in shipment.

The embodiment of this invention discloses a fork for use in kitchens and in connection with cooking generally. The purpose is to provide an elongated utensil of this character which is of sufficient length and which may be knocked down and folded so as to be conveniently shipped and in which the sharp ends or tines are protected so as to prevent piercing the shipping carton or package.

A further object of this invention includes the provision of such an implement which is simple in construction, cheap to manufacture, easy to knock down and fold and easy to pack and ship.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show, merely for the purpose of illustrative disclosure, a preferred embodiment of my invention, it being expressly understood, however, that various changes may be made in practice within the scope of the claims without digressing from my inventive idea.

In the drawings—

Figure 1 represents a side elevation of a device constructed to embody my invention shown in its extended form.

Figure 2 is a view of the device shown in Figure 1 in its knockdown or folded form ready to be inserted in a carton or other shipping package.

Figure 3 is a cross section taken substantially on line 3—3 of Figure 1 to show the method in which the extension part of the implement is positioned within the handle part of the same.

Figure 4 represents a vertical transverse cross section taken substantially on line 4—4 of Figure 2.

Referring now to the drawings the numeral 1 designates the handle portion of the implement provided at one end with the gripping element 2 and provided at its other end with the recess or socket 3 protected by a suitable ferrule or cap 4.

The extension portion of the implement or utensil is designated 5 and is shown in the form of a fork having the usual prongs or tines 6 and having the elongated portion 7 terminating in a looped end 8. This looped end is of substantial length and has parallel portions 9 suitably spaced apart and joined at the end by the rounded end portion 10. This portion of the implement is preferably formed of one piece as clearly shown in Figure 3. The looped end 8 is adapted to be forced into the recess or socket 3 in the end of the handle portion and securely held therein by friction, the sizes of these parts being such as to best accomplish this purpose.

A loop member 11 is secured preferably into the end of the handle member 1 adjacent the socket or recess 3 and this loop member has a portion 12 extending beyond the edge of the end of the handle part. This loop member fits between the two parallel portions 9 of the loop 8 of the extension part 5 of the implement and, consequently, when the parts are in extended position this loop element assists in holding the parts. When it is desired to separate the parts to put the implement away or ship it, the extension part 5 is removed from the recess or socket and the looped end 8 thereof is swung around the loop member 11 as a pivot or hinge. The end of the loop 8 engages within the extension 12 of loop member 11 so that the major portion of the extension member 7 is positioned along and parallel to the major portion of the handle part 1, the tines or prongs resting against the gripping element 2, as clearly shown in Figure 2. This gripping element 2, of course, is of sufficient size to insure that the prongs or tines do not project beyond the sides thereof. Suitable means is provided for holding the parts in this knockdown or folded position. One form of such means is illustrated and constitutes a ring 13 slidably mounted on the handle part 1 and having the upwardly and laterally extending locking projection 14, which is adapted to fit over and engage the elongated part 7 of the extension member 5, as clearly shown in Figure 4. This engagement is frictional and is sufficiently strong to hold the prongs or tines of the fork against the gripping element 2 and prevent disarrangement during the shipping or storage. Of course, the movement of the ring 13 away from the locking position shown in Figure 4 is readily accomplished, releasing the extension part 5 so that it may be swung on its pivot 12 and held in extended position as shown in Figures 1 and 3.

What I claim is:—

1. A knockdown device of the character described including a handle member having a socket formed in one end, a loop element secured to the same end of the handle member and extending beyond the edge thereof, an extension member formed with a loop at its inner end embracing the said loop element and to frictionally fit within the socket in the handle member, said extension of the loop element cooperating with the end of the loop of the extension member to provide a hinge to one side of the handle member so that the extension member can be folded back upon the handle member.

2. A fork including, in combination, a handle member having a socket at one end and also having a loop hinge element at the same end, an extension member provided with prongs or tines at one end and a loop at the other end adapted to frictionally fit within the socket in the handle member and also embrace the loop element on the end thereof, the loop element and the loop of the extension member cooperating to provide a hinge whereby the extension member may be folded back upon the handle member, said handle member being provided with an enlarged grip with which the prongs or tines of the extension member engage when in folded position, and means for holding the extension member in association with the handle member with the tines or prongs on opposite sides of the gripping element.

3. A device of the character described including a handle member having a socket at one end and also a loop hinge element at the same end, an extension member provided with a loop at one end adapted to frictionally fit within the socket in the handle member and also embrace the loop element on the end thereof, the loop element and the loop of the extension member co-operating to provide a hinged construction whereby the loop of the extension member may be removed from the socket in said handle member and the extension member may be folded back upon said handle member.

4. A fork including, in combination, a handle member having a socket on one end and also having a loop hinge element at the same end, an extension member provided with prongs or tines at one end and a loop at the other end adapted to frictionally fit within the socket in said handle member and also embrace the loop element on the end thereof, the loop element and the loop of the extension member co-operating to provide a hinge construction, whereby the loop of the extension member may be withdrawn from the socket in said handle member and the extension member may be folded back upon said handle member, and means for holding the extension member when in folded position in close contact with said handle member.

In testimony that I claim the foregoing, I have hereunto set my hand this 24th day of December, 1929.

ADOLPH F. SHAFTER.